United States Patent [19]

Humiston

[11] 4,200,807
[45] Apr. 29, 1980

[54] METHOD OF ELECTRICAL CLOSED HEAT PUMP SYSTEM FOR PRODUCING ELECTRICAL POWER

[76] Inventor: Gerald F. Humiston, Apt. E 202, 2909 Gulf to Bay Blvd., Clearwater, Fla. 33519

[21] Appl. No.: 833,664

[22] Filed: Sep. 15, 1977

[51] Int. Cl.² .............................................. H02P 9/04
[52] U.S. Cl. .................................. 290/1 R; 60/641; 60/667; 290/40 A
[58] Field of Search ........................ 290/1 R, 40 A, 43; 60/641, 651, 671, 665, 667, 398

[56] References Cited

U.S. PATENT DOCUMENTS 1,493,368   5/1924   Merz ........................................ 60/641

OTHER PUBLICATIONS

Zener, "Solar Sea Power", Physics Today, Jan. 1973, vol. 26 No. 1, pp. 48–53.

*Primary Examiner*—Gene Z. Rubinson
*Assistant Examiner*—Morris Ginsburg
*Attorney, Agent, or Firm*—Stein & Frijouf

[57] ABSTRACT

A method of electrical power generation is disclosed wherein the energy source to operate the said electrical power generation apparatus is that energy existing between two fluid sources being at different temperatures and therefore at different energy levels. These fluid sources could be as divergent as warm underground crude oil as it is pumped from wells and the cooler atmospheric air above the said oil wells, or as intimately related as the warm water output from conventional and nuclear power generating plants and the cooling water source usually available to such generating plants. Warm water pumped from deep below the earths surface, geo-thermally heated, as the warm or hot source and surface water from lakes, oceans, rivers, etc. as the colder, or lower energy source provides an additional source of energy for the method of electrical power generation herein described. Perhaps the largest source of waters, in which sufficient temperature differentials exist, are tropical ocean waters where temperature differences between the warm surface water and the cold deep ocean water, several thousand feet below the ocean surface, are often as high as 40° to 45° F.

11 Claims, 1 Drawing Figure

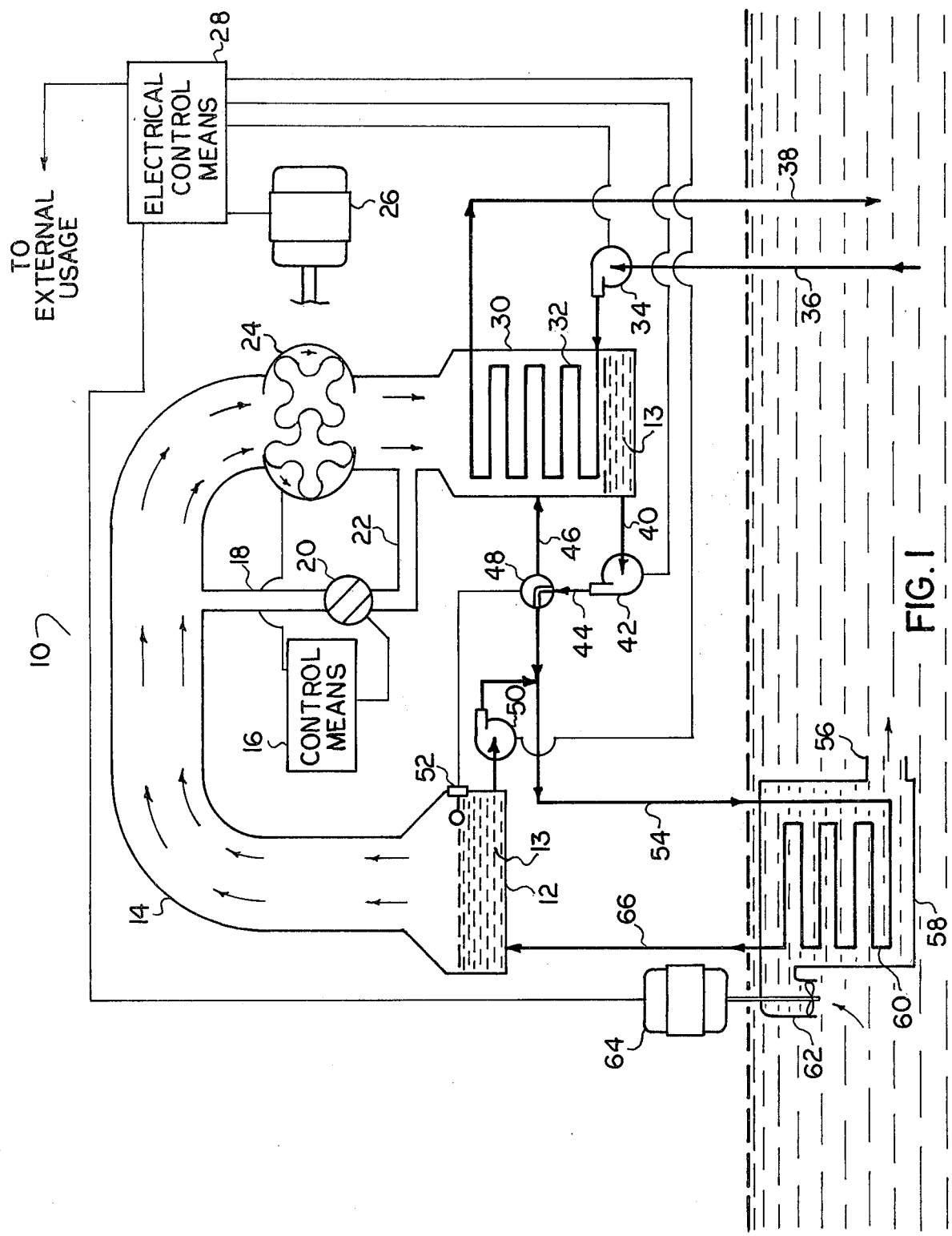
FIG. I

METHOD OF ELECTRICAL CLOSED HEAT PUMP SYSTEM FOR PRODUCING ELECTRICAL POWER

BACKGROUND OF THE INVENTION

1. Field of the Invention

This invention relates to a heat pump process and apparatus which is applicable to the generation of electrical power, production of mechanical power, and cooling of dishcarges from nuclear and thermal electrical generating plants and more particularly to a process and apparatus comprising an evaporator and a condenser where the heating necessary to cause evaporation in the evaporator and the cooling necessary to cause condensing in the condenser are obtained from warm and cold fluid sources.

2. Description of the Prior Art

The shortage of oil and natural gas is rapidly becoming a significant problem for producers of electrical energy and well as other processors that require large amounts of energy to process their products. As the supplies of the fossilized fuels are diminishing and their costs escalating, it is necessary to investigate the so-called natural energies such as hydro power, solar energy, indirect solar energy, etc. One of the many faceted solutions to the present energy crisis appears to lie in the utilization of the the energy differentials existing between two fluid sources at different temperatures, such as are present in tropical ocean waters wherein the warm ocean surface waters are at temperatures considerably higher than the cold deep ocean waters.

Although the total energy existing in two large fluid sources at different temperatures is enormous, the specific energy, the energy existing per unit of weight or mass is very small indeed, necessitating new and novel techniques and cycles to utilize the small amount of specific energy available to do productive work.

The heat pump has been known as one of the most efficient methods for heating and cooling with the application of small amounts of external energy. Application of heat pump principles appear to offer the solutions for obtaining usable energy from the aforementioned energy sources with low specific energies. Previously, heat pump systems have been designed to obtain the maximum amount of heat transfer from one source to another souce with the minimum amount of power applied. To utilize heat sources of low specific energy for the production of energy, it is now necessary to devise heat pump systems that will produce the maximum amount of energy with the minimum amount of heat energy applied.

Therefore it is an object of this invention to provide a process and an apparatus which overcomes the aforementioned inadequacies of the prior art devices and provides an improvement which is a significant contribution to the advancement of the pertinent art.

Accordingly, it is an object of the present invention to provide a novel and improved heat pump system which is operable to produce mechanical power and/or electrical power using a warm fluid source for supplying heat to offset the heat loss which occurs during vaporization of a refrigerant and a cold fluid source to effect condensing of the refrigerant vapors.

It is also an object of the present invention to provide a process an an apparatus into which a prime mover is driven by the pressure difference between the evaporator section of the apparatus, and the lower saturation pressure of the refrigerant in the condenser section of the apparatus.

It is another object of this invention to provide a means of converting all or part of the output of the said prime mover to electrical energy by means of an electrical generator and an electrical control means.

It is still another object of the present invention to provide a controlled means of returning the condensed refrigerant from the condenser means to the evaporator means to replace the refrigerant evaporated in the evaporator means.

A further object of the present invention is to provide a means of controlling the speed of the prime mover means regardless of variations in the load on the generator means, by means of a control valve means and conduit means in parallel with the prime mover means which is capable of by-passing a portion of the flow of refrigerant vapors from the evaporator means to the condenser means, thereby controlling the pressure across the prime mover means.

Yet another object of the present invention is to provide a heat exchanger means and a pump means to bring the refrigerant in the evaporator means into thermal contact with the warm fluid source, effectively replacing the heat of vaporization lost in the evaporator means by the evaporating of the refrigerant.

Still another object of the present invention is to provide a heat exchanger means within the condenser means wherein the refrigerant vapors in the condenser means are brought into thermal contact with the cooling fluid to remove the heat of condensation.

Another object of the present invention is to provide a closed system in which a refrigerant is present at saturation pressures corresponding to the saturation pressures for the given refrigerant at the various temperatures that are present in the system.

Another object of the present invention is to provide a prime mover of the positive displacement type with the lowest possible volumetric efficiency in order to derive the maximum power from the existing and available pressure differentials while requiring the least mass flow of refrigerant vapors and subsequently requiring the least energy from the fluid sources.

Other objects and a fuller understanding of this invention may be had by referring to the summary of the invention, the description and the claims, taken in conjunction with the accompanying drawing.

SUMMARY OF THE INVENTION

It has now been found that the foregoing and related objects can readily be attained in a novel and improved heat pump process and apparatus for the production of mechanical power and electrical energy using fluid sources of low specific energy as the means of powering the process and apparatus. Although these two fluid sources could be oil, natural gas, atmospheric air, waste streams, salt water, fresh water, or any other two fluids in which energy differentials exist as a function of their different temperatures; I shall, for simplicity, refer to the two fluids as a warm water source and a cold water source.

This process and apparatus comprises a closed heat pump system containing a refrigerant such as ammonia, freon, water, carbon dioxide, carrene, or any other suitable refrigerant and comprises an evaporator means and a condenser mans. Conduit means connects the said evaporator means to the said condenser means. Heat exchanger means and pump means brings the refrigerant in the evaporator means into thermal contact with the warm water source. Heat exchanger means within condenser means and a pump means brings the refrigerant vapors in the condenser means into thermal contact with the cold water source. A pump means and conduit means returns the condensed refrigerant, liquid, back into the evaporator means. A liquid level control means within the evaporator means and a divert valve means allow the refrigerant to flow from the condenser means to the evaporator means when the level of the refrigerant in the evaporator is less than the desired level and allows the refrigerant to flow back into the condenser means when the refrigerant level in the evaporator means is satisfactory. A prime mover means is interposed into the conduit means connecting the evaporator means to the condenser means. An electrical generator means is coupled to the prime mover means to convert all or part of the power developed in the prime mover means to electrical power. An electrical control means is connected to the electrical generator means to direct the electrical power from the electrical generator means to the elements of the apparatus which require electrical power, and further, to direct excess electrical power for external usage. A controllable valve means is disposed and conduit means, in parallel with the prime mover means, whereby the refrigerant vapor flow, and subsequent pressure, can by-pass the said prime mover means as a means to control the speed of the prime mover means compensating for variations in loads on the electrical generator means. An optional enclosure, the heat exchanger means, with an inlet means and an outlet means and a recirculating pump means to provide increased heat exchanger efficiency due to the forced circulation of the warm water source through the enclosure.

A fundamental characteristic of the heat pump system, of which this invention is a novel variation, comprises a closed loop system established between an evaporator means and a condenser means In the case of the subject invention, the heat to the evaporator means is furnished by the warm water source, and the cooling, or condensing, means in the condenser means is furnished by the cold water source, the process operating at the saturation pressures for the refrigerant. The prime mover means is interposed in the closed loop to provide mechanical power as well as power to drive an electrical generator means. An electrical control means directs electrical power to the elements of the apparatus, and further directs excess electrical power for external usage. A pump means, conduit means, divert valve means and a liquid level control means return the condensed refrigerant, liquid, to the evaporator means in a controlled manner. The speed of the prime mover means is controlled by a controllable valve means and conduit means in parallel with the prime mover means.

The power developed by the said prime mover means is a function of the pressure differential across the prime mover means. The pressure differential is the difference between the saturation pressure of the refrigerant in the evaporator means, which is heated by the warm water source, and the saturation pressure of the refrigerant in the condenser means, which is cooled by the cold water source. Since the prime mover is of the positive displacement type, the amount of refrigerant vapors passing through the prime mover means is a function of its volumetric efficiency. Therefore it is desirable to use a positive displacement prime mover with the lowest possible volumetric efficiency in order to use the least amount of refrigerant vapors and therefore obtain the maximum amount of generated power for the amount of heat available.

The practice of the instant invention enables an apparatus capable of producing mechanical power and electrical power generation using water sources of low specific energy in an efficient manner.

This invention accordingly comprises a process and an apparatus possessing the features, properties and the relationship of elements which will be exemplified in the article hereinafter described, and the scope of the invention will be indicated in the claims.

BRIEF DESCRIPTION OF THE DRAWING

For a fuller understanding of the nature and objects of the invention, reference should be had to the following detailed description taken in connection with the accompanying drawing in which:

FIG. 1 illustrates a specific example of the instant invention, namely an apparatus capable of the production of mechanical power and electrical power generation using only the energy available from low specific energy sources, namely two fluid sources at different energy potentials as a result of their differences in temperature.

DETAILED DESCRIPTION OF THE DRAWING

Referring now to FIG. 1, therein illustrated is one embodiment of an apparatus for the production of mechanical power and the production of electrical power, which functions as a heat pump deriving the energy needed to sustain its own operation, and additionally, excess power for external usage, from two fluid sources at different energy levels as a result of their being at different temperatures. A distinguishing feature of this invention is that the apparatus herein described and illustrated uses a positive displacement type of prime mover which derives its power from the pressure difference across the prime mover and being of low volumetric efficiency, displaces a minimum of refrigerant vapors. Since this is basically an adiabatic throttling process, extremely low temperature differences between the evaporator and condenser can be used to produce significant power as opposed to a turbine type of prime mover which would require large changes in enthalpy to obtain significant power. Thus the apparatus herein described and illustrated can use two fluid sources at temperature differences, which have heretofore been considered insignificant, to supply the energy necessary to power the apparatus.

The major components of the apparatus illustrated in FIG. 1 include an evaporator designated by the numeral 12. The evaporator 12 functions as a reservoir for the refrigerant generally designated by the numeral 13. The pump designated by the numeral 50 draws the refrigerant 13 from the evaporator 12 and by means of a conduit designated by the numeral 54 pumps the refrigerant 13 into the heat exchanger designated by the numeral 60 and then returns said refrigerant 13 to the evaporator 12 through a conduit designated by numeral 66, thus, bringing the refrigerant 13 into thermal contact with the warm fluid source. A condenser designated by the numeral 30 contains therein a heat exchanger designated by the numeral 32. A pump designated by the numeral 34 draws in fluid from the cold fluid source through a conduit designated by the numeral 36 and pumps said fluid through the heat exchanger 32. The cold fluid is subsequently returned to the cold fluid source by means of a conduit designated by the numeral 38. A means has thus been established to bring the cold fluid from the cold fluid source into thermal contact with the refrigerant vapors within the condenser 30. A conduit designated by the numeral 14 connects the evaporator 12 and the condenser 30. A prime mover of the positive displacement type designated by the numeral 24 is interposed into the conduit 14. An electrical generator designated by the numeral 26 is coupled to the prime mover 24 to convert all or part of the power developed in the prime mover 24 into electrical power. An electrical control designated by the numeral 28 directs the electrical power produced by the electrical generator 26 to the elements of the apparatus which require electrical power, and further, directs excess electrical energy for external usage. A conduit designated by the numeral 18, a conduit designated by the numeral 22 and a controllable valve designated by the numeral 20, placed in parallel with the prime mover 24, control the speed of the prime mover 24 to a constant value by the capability of by-passing the flow of refrigerant vapors around the prime mover 24 thus compensating for variations in loads on the electrical generator 26. A control means designated by the numeral 16 senses the speed of the prime mover 24 and modulates the controllable valve 20. A pump designated by the numeral 42 draws condensed refrigerant vapors, liquid, from the condenser 30 through a conduit designated by the numeral 40 and pumps said refrigerant 13 through a conduit designated by the numeral 44 to a divert valve designated by the numeral 48. A liquid level control designated by the numeral 52 is located in the evaporator 12. The liquid level control 52 maintains the desired level of refrigerant 13 in the evaporator 12 by controlling the divert valve 48, allowing the refrigerant 13 to flow into the evaporator 12 by means of conduit 54 when the level of the refrigerant 13 in the evaporator 12 is less than the desired level, and diverting the flow of said refrigerant 13 back into the condenser 30 when the level of the refrigerant 13 in the evaporator 12 is satisfactory by means of a conduit designated by the numeral 46. When thermal circulation of the warm fluid source around the heat exchanger 60 is insufficient for a particular design or when the warm fluid source is confined, as in the case of warm oil in a pipeline, an enclosure designated by the numeral 58 encloses the heat exchanger 60. This enclosure is provided with an inlet means designated by the numeral 62 and an outlet means designated by the numeral 56. Flow of the warm fluid from the warm fluid source is induced by a recirculating pump designated by the numeral 64.

With further reference to FIG. 1, a specific example of the instant invention is illustrated wherein the warm and cold fluid sources are specifically the warm ocean surface water and the cold deep ocean water. The closed apparatus 10 is initially evacuated of air and gas and charged with the refrigerant 13 to be used, let us say for the purposes of this example, ammonia. The refrigerant 13 exists as a liquid to the level in the apparatus 10 to which it is filled and the balance of the apparatus 10 is then filled with the refrigerant 13 vapors at the saturation pressure for ammonia corresponding to the temperature of the apparatus 10. For example if the apparatus was 80° F., the pressure in the apparatus 10 would be the saturation pressure of ammonia at 80° F., or 153 psia. Operation of the apparatus 10 is then instituted by means of auxiliary power equipment since no electrical power exists at the electrical control 28. Cooling, or condensing, water is then being pumped through the heat exchanger 32 within the condenser 30 by the pump 34 which draws in cold deep ocean water through conduit 36 and pumps the same to the heat exchanger 32. After passing through the heat exchanger 32, the cold, or condensing, water is returned to the ocean by means of conduit 38. Pump 50 draws refrigerant 13 from the evaporator 12 and by means of conduit 54, pumps the refrigerant 13 to the heat exchanger 60 and the refrigerant 13 is returned to the evaporator 12 by means of conduit 66. The recirculating pump 64 draws warm ocean surface water into the inlet 62 of the enclosure 58 and discharges this flow around the heat exchanger 60 and out of the outlet 56 of the said enclosure 56. The refrigerant 13 is thus effectively brought into thermal contact with a heating source, in this case warm surface ocean water. The saturation pressure in the evaporator then becomes the saturation pressure of the refrigerant 13 corresponding to the temperature to which it is being heated by the warm ocean surface water and the saturation pressure in the condenser 30 is then the saturation pressure for the refrigerant 13 in the condenser 30, corresponding to the saturation pressure for the refrigerant 13 for the temperature to which the refrigerant is being cooled by the cooling, or deep ocean water. In this example, if the effective temperature in the evaporator 12 were to be 80° F., the pressure in the evaporator 12 portion of the apparatus 10 would be 153 psia, and if the effective temperature in the condenser 30 were to be 60° F., the pressure in the condenser 30 portion of the apparatus 10 would be 107.6 psia, thus creating a pressure differential of 45.4 psi across the prime mover 24. The prime mover 24 is driven by this pressure differential and the mass flow of refrigerant vapors from the evaporator 12 to the condenser 30 would be a function of the volumetric displacement of the prime mover 24. The electrical generator 26, driven by the prime mover 24, then provides the energy to operate the apparatus. The condensed refrigerant vapors, liquid, in the condenser 30, are returned to the evaporator 12 by means of pump 42, which draws the refrigerant 13 from the condenser 30 through conduit 40 and pumps this refrigerant 13 to the divert valve 48. The liquid level control 52 controls the level of the refrigerant 13 in the evaporator by operating the divert valve 48, allowing refrigerant 13 to flow from the divert valve 48 to the evaporator 12 through conduit 54 when the level of the refrigerant 13 in the evaporator 12 is less than the desired level and diverting the refrigerant 13 flow back into the condenser 30 through conduit 46 when the level of the refrigerant 13 in the evaporator 12 is satisfactory. The control 16 senses the speed of the prime mover 24 and controls the controllable valve 20 to maintain the speed of the prime mover 24 constant, compensating for variations in loads on the electrical generator 26.

A heat pump method of producing mechanical power and electrical power has thus been described, whereby the temperature differentials present in the ocean, or other warm and cold fluid sources, is the only energy required to power the said apparatus and and provide excess power and/or electrical power for external usage.

The foregoing process and apparatus has a substantial savings over that of the prior art in that no conventional energy sources are required to operate the apparatus and the apparatus utilizes energy sources of low potential, low temperature differences, to effectively obtain significant power production.

The present disclosure includes that contained in the appended claims, as well as that of the foregoing description. Although this invention has been described in its preferred forms with a certain degree of particularly, it is understood that the present disclosure of the preferred forms has been made only by way of example and numerous changes in the details of construction and the combination and arrangement of parts may be resorted to without departing from the spirit and scope of the invention.

Having thus described the invention, I claim:

1. A heat pump system for producing electrical power, comprising in combination:
    a heat pump for a first fluid comprising an evaporator and a condenser interconnected by a conduit;
    a closed evaporator heat exchanger disposed remote from said evaporator and in thermal contact with a warm second fluid and connected to said evaporator for heating the first fluid in said evaporator;
    a closed condenser heat exchanger disposed in thermal contact with said condenser for absorbing heat from the condensing first fluid;
    means for introducing a cold third fluid remote from said condenser into said closed condenser heat exchanger for condensing the first fluid;
    condenser return conduit means connecting said condenser to said evaporator and extending through said closed evaporator heat exchanger for heating the condensed first fluid prior to introduction into said evaporator;
    a prime mover interposed in said conduit for providing mechanical energy from the mass flow of vapor from said evaporator to said condenser;
    an electrical generator coupled to said prime mover to convert said mechanical energy into an electrical power output; and
    electrical control means connected to said electrical generator for directing the electrical power output thereof to operate the heat pump system and for directing any excess electrical power output for external usage.

2. A heat pump system as set forth in claim 1, wherein the first fluid has different physical properties than the second fluid.

3. A heat pump system as set forth in claim 1, wherein said condenser return conduit means forms a closed heat pump.

4. A heat pump system as set forth in claim 3, including a condenser pump interposed in said condenser return conduit means for pumping the condensed first fluid through said evaporator heat exchanger to said evaporator.

5. A heat pump as set forth in claim 4, including liquid level control means connected to said condenser return conduit means for maintaining a desired level of the first fluid in said evaporator.

6. A heat pump system as set forth in claim 1, including a bypass conduit connected in parallel with said prime mover; and
    bypass control valve means interposed in said bypass conduit for controlling the flow of the first fluid around said prime mover for controlling the speed thereof.

7. A heat pump system as set forth in claim 1, including an evaporator return conduit for circulating the first fluid in said evaporator through said closed evaporator heat exchanger.

8. A heat pump system as set forth in claim 7, including an evaporator pump interposed in said evaporator return conduit for circulating the first fluid through said closed evaporator heat exchanger back to said evaporator.

9. A heat pump system as set forth in claim 1, including an enclosure encompassing said evaporator heat exchanger;
    said enclosure having an input and an output enabling the warm second fluid to flow therethrough.

10. A heat pump system as set forth in claim 9, including a recirculating pump for providing forced circulation of the warm second fluid within said enclosure.

11. A heat pump system as set forth in claim 1, wherein said means for introducing the cold third fluid includes a condenser pump interposed in a conduit interconnecting the cold third fluid to said condenser heat exchanger.

* * * * *

UNITED STATES PATENT AND TRADEMARK OFFICE
CERTIFICATE OF CORRECTION

PATENT NO. : 4,200,807

DATED : April 29, 1980

INVENTOR(S) : Gerald F. Humiston

It is certified that error appears in the above-identified patent and that said Letters Patent are hereby corrected as shown below:

Column 1, line 66, delete "an" (first occasion) and insert --and--;

Column 2, line 66, delete "mans" and insert --means--;

Column 3, line 39, after "means (second occasion) insert --.--.

Signed and Sealed this

Tenth Day of February 1981

[SEAL]

Attest:

RENE D. TEGTMEYER

Attesting Officer     Acting Commissioner of Patents and Trademarks